United States Patent [19]
Rose

[11] Patent Number: 6,119,116
[45] Date of Patent: Sep. 12, 2000

[54] SYSTEM AND METHOD FOR ACCESSING AND DISTRIBUTING AUDIO CD DATA OVER A NETWORK

[75] Inventor: Robert Allen Rose, Round Rock, Tex.

[73] Assignee: International Business Machines Corp., Armonk, N.Y.

[21] Appl. No.: 08/993,114

[22] Filed: Dec. 18, 1997

[51] Int. Cl.$^7$ .............................. G06F 12/00; G06F 17/30
[52] U.S. Cl. ........................... 707/10; 707/101; 707/104; 709/203; 709/219
[58] Field of Search ..................................... 707/200, 104, 707/10, 1, 2, 101; 364/400.01; 84/601, 602; 369/30–32; 709/203, 219

[56] References Cited

U.S. PATENT DOCUMENTS

| | | | |
|---|---|---|---|
| 5,633,472 | 5/1997 | DeWitt et al. | 84/602 |
| 5,684,786 | 11/1997 | Schylander et al. | 369/275.3 |
| 5,752,244 | 5/1998 | Rose et al. | 707/5 |
| 5,848,422 | 12/1998 | Sato et al. | 707/203 |

OTHER PUBLICATIONS

Chris Sherman, Ed., The CD–Rom Handbook 2nd Edition, pp. 542–571.
Glen Ballou, Ed., Handbook for Sound Engineers The New Audio Cyclopedia 2nd. Edition, pp. 1013–1031.

*Primary Examiner*—Paul V. Kulik
*Attorney, Agent, or Firm*—David A. Mims, Jr.; Andrea Pair Bryant Hughes & Luce, L.L.P.

[57] ABSTRACT

A system, method and computer program are provided in an installable file system (IFS) for a network server for enabling access to and distribution of Audio CD information over a client server network by creating a virtual directory of computer audio files from Table of Contents information read in raw sector mode from an audio CD in a CD-ROM drive, which virtual audio files appear to the server's operating system as normal files stored on a convention file system.

4 Claims, 3 Drawing Sheets

SYSTEM AND METHOD FOR ACCESSING AND DISTRIBUTING AUDIO CD DATA OVER A NETWORK

TECHNICAL FIELD

The present invention relates to storage of digital audio data for subsequent access and distribution, including access and distribution over a network. More particularly, it relates to a method for the efficient storage of audio CD data in a CD-Rom drive interconnected to a client server network.

BACKGROUND OF THE INVENTION

There are currently occasions in which it is desirable to store digital audio data for use within networked computer systems. Digital audio data exists in any one of several standard formats, most often in the Philips Audio CD or Red Book format. The Red Book standard includes 2352 bytes of user data in each CD Audio sector which corresponds to $\frac{1}{75}$ second, along with error detection and correction code and control information.

There are other standard CD formats and information about them is widely available. Such a source is "The CD-ROM Handbook" Second Edition, edited by Chris Sherman and published by Intertext Publication McGraw-Hill, Inc.

The current state of the art is that network servers are unable to directly support audio CDs. A frequently used approach to handling this situation is to sample audio Cds and to then store the resulting huge data files on conventional storage media such as CD-ROMs or magnetic direct access storage device (DASD) units. The latter option is sometimes not cost efficient as DASD is far more expensive than equivalent capacity CD-ROM storage.

Today's computer users often want multimedia data for a variety of applications. There are many situations where audio CD data is needed, not only for listening but also for distributing to others on demand usually over a network which includes LAN and internet connected clients. Any system handling large amounts of audio data is better when resource requirements associated with using audio data can be reduced.

It is therefore desirable to improve the cost aspects of using digital audio data within interactive client server networks.

SUMMARY OF THE INVENTION

The present invention addresses the shortcomings of the prior art by providing a system and method for accessing and using digital audio data in a manner that is more cost efficient from the standpoint of both hardware expense and operational throughput. The present invention is an Installable File System (IFS) which is able to access an audio CD in a CD-ROM drive and utilize information on the CD to construct a virtual directory of audio files which then appear to an operating system as normal files resident in a conventional file system.

The logic implemented in the inventive IFS causes an audio CD to be read in raw data sector mode. Information comprising the CD table of contents (ToC) is used to perform a mapping operation to transform that information into a virtual directory for subsequent use while accessing audio data directly from CD-ROM drives. When an operating system requests a directory, the present invention reports the virtual directory. When an area of a virtual file is read, the inventive IFS executes a backmapping logic sequence and starts a raw sector read of the audio CD. That CD data read is then reformatted by the IFS into the expected format and presented to the operating system in satisfaction of the virtual file read operation.

The present invention eliminates the prior art required step of first converting audio CD data to correlated DASD data, thereby realizing savings in time and equipment costs. Further, the present invention facilitates easier access to available audio content since any of several standard CD formats may be used. Because the present invention enables audio CD data to be accessed as any normal file in a conventional file system, existing applications may, without any changes thereto, use audio CD material.

BRIEF DESCRIPTION OF THE DRAWINGS

The aforementioned functions, features and advantages will be described in greater detail having reference to the following figures wherein like numerals and symbols are used throughout to refer to the same elements.

DETAILED DESCRIPTION OF THE PREFERRED EMBODIMENT

Figure 1:
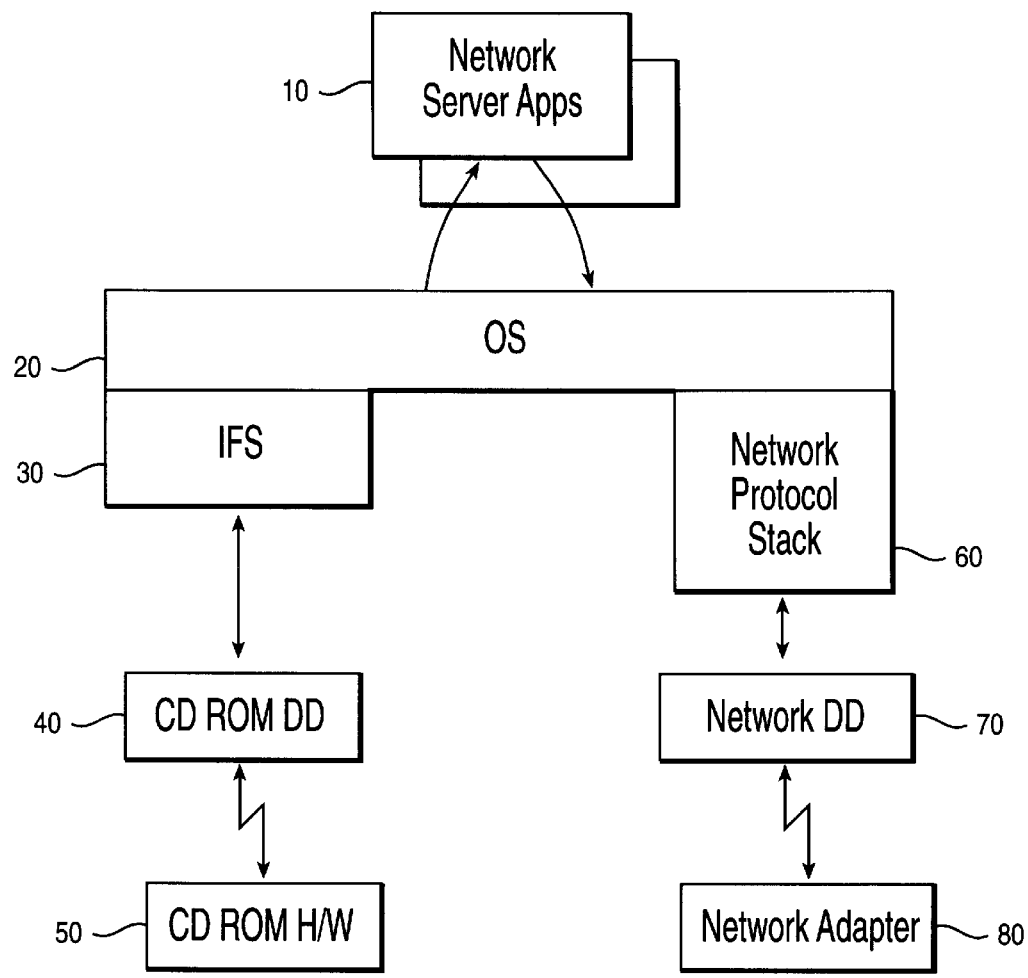
FIG. 1 is a schematic block diagram of a data processing system in which the present invention may be practiced.

Refer now to FIG. 1, which shows the primary software and hardware elements involved in the present invention. A network server application 10, which may be one of many, is under control of operating system 20. In this description, operating system 20 may be an IBM OS/2 operating system executing on the Intel processor X86 architecture. Operating system 20 communicates through the installable file system 30, comprising the present invention, with CD ROM device driver 40 in order to access CD ROM drive 50. Also connected with operating system 20 is network protocol stack 60, which may be TCP/IP, Net Bios or the like, as is well understood in the art. Network protocol stack 60 is interconnected to network device driver 70 which operates with network hardware adapter 80. Elements 70 and 80 may be any well known driver adapter combination publicly available.

Figure 2:
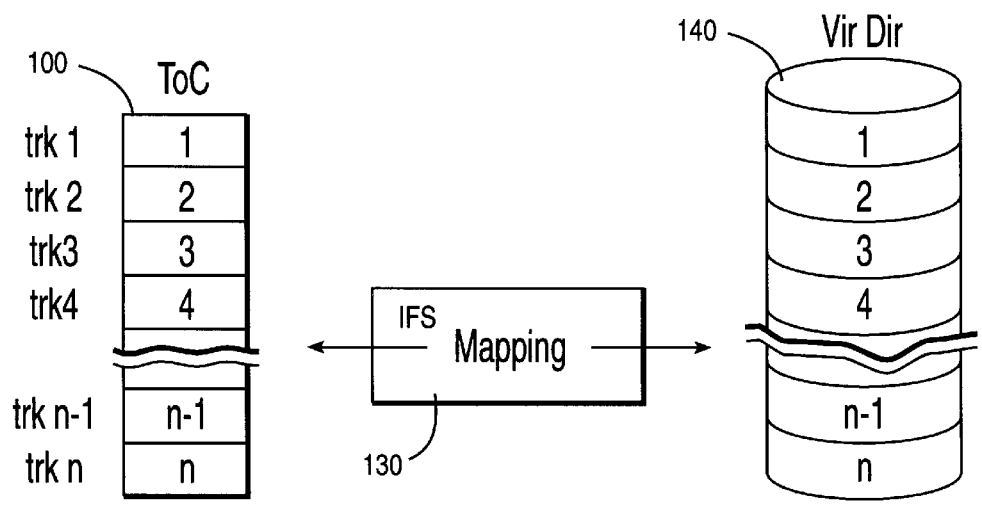
FIG. 2 illustrates construction of a virtual directory in accordance with the invention.

The technique implemented in IFS 30 for constructing a virtual file directory correlating tracks on an audio CD in CD drive 50 will be described in conjunction with FIG. 2. An audio CD Table of contents ToC contains, inter alia, the number of tracks and for each track thereon an indication, in time units, of track start, relative to the beginning of the CD, and length in frames. Structure 100 represents a ToC with n tracks shown as trk 1 through trk n. The start, in Absolute Time, and length, in number of frames, of each of trks 1 through n is expressed in absolute time (A-Time) which begins at the start of a disk.

A-Time differs from Track Relative Time which begins at each track start. Both A-Time and TR-Time are expressed in minutes, seconds and frames, mm:ss.fff. Each frame corresponds to one sector which is $\frac{1}{75}$ second. One sector or frame, it will be recalled, is equivalent to 2352 bytes of user data in Red Book format.

Each entry, including an A-Time start and a length in frames ($\frac{1}{75}$ seconds), in ToC 100 is successively accessed by mapping logic 130, part of IFS 30, and used to formulate a correlated entry in virtual directory 140. Each entry in virtual directory 140 comprises a filespec and a length in bytes. In this illustrative embodiment, filespec is TRACK-n.RAW; and length is calculated as a function of ToC length using the following relationship:

ByteLength=(sector length*sample rate* bytes/sample*number of channels)/75.

Sample rate is 44,1000. Bytes per sample is 2 and the number of channels is 2 for a stereo file. This calculation would be different if another virtual file type, e.g. WAV or VOC were presented to operating system 20 due to file format differences.

Upon completion of the build operation, virtual directory 140 has file entries corresponding in number to the number of tracks indicated in ToC 100 for a CD in drive 50. Thereafter, virtual directory 140 is reported to operating system 20 whenever it inquires as to media present in CD-ROM drive 50.

When the occasion arises for operating system 20 to initiate a seek, either directly or because an application so orders, usually in preparation for reading the CD, a byte offset is passed by operating system 20 to IFS 30.

Figure 3:
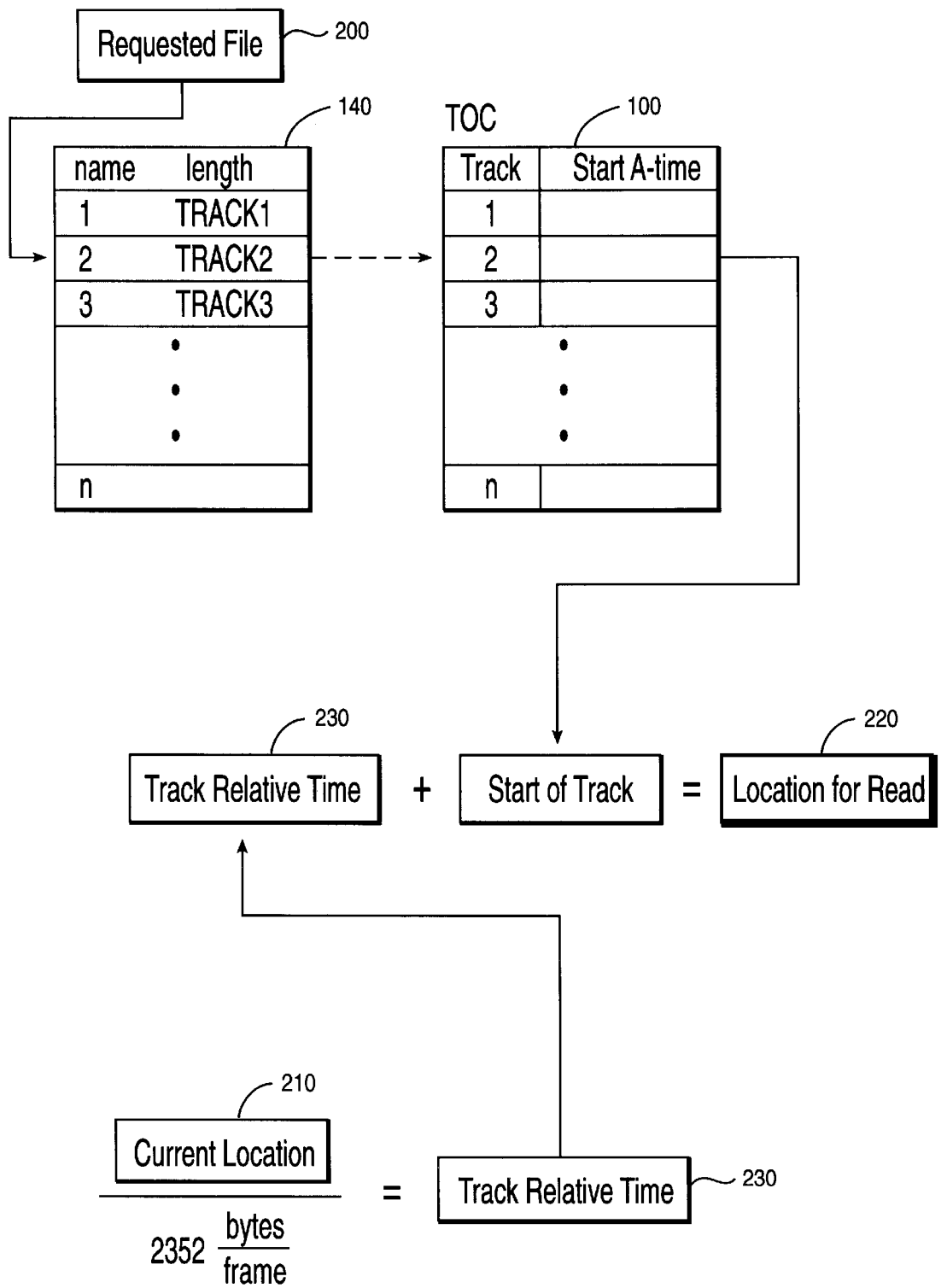
FIG. 3 illustrates accessing audio CD data by back mapping from an offset into a virtual directory constructed in accordance with the present invention.

Referring now to FIG. 3, that byte offset, the Current Location 210, is saved for future read operations. Current Location 210 is used in the back mapping logic of IFS 30 to develop the actual frame 220, i.e. sector, location on a CD in drive 50 for use in the subsequent read.

When operating system 20 reads an area of a virtual file 200, defined in virtual directory 140, IFS 30 back maps the Current Location 210 to the offset 230 within the raw audio CD data stream. The following relationship is used for that calculation.

Track Relative Time in frames=byte offset/2352 bytes per frame.

The entry in virtual directory 140 correlates to and enables access to the start in A-Time of the appropriate track entry in ToC 100. Then, using track relative time in frames, calculated as above described, IFS 30 controls the read from a CD in drive 50. Conventional techniques are employed for OPENing and CLOSing the file to be read from.

When the raw sector read completes, IFS 30 reformats the data into the format specified by operating system 20. In this case, raw sector format is equivalent to CD-ROM standard format so there is a 1:1 correspondence.

Figure 4:
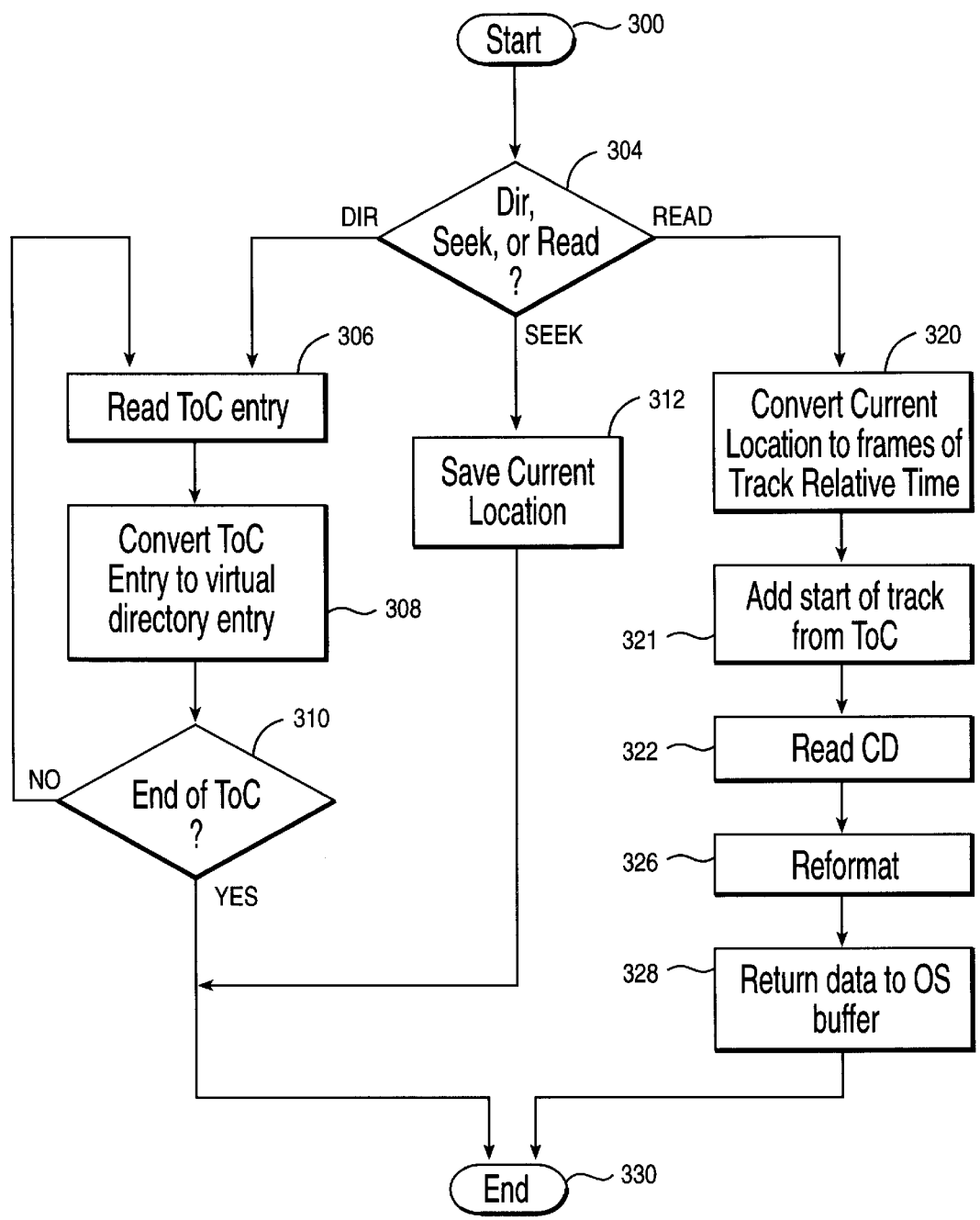
FIG. 4 depicts logic implemented within the IFS of the invention.

In FIG. 4 the basic logic implemented in IFS 30 is set forth. The logic is entered at terminal 300. At step 304 a determination is made whether a virtual directory is to be constructed, a seek within an audio file is to occur or a read from an audio CD data file is desired. If the first option, i.e. build a virtual directory is requested, a loop is entered at block 306 to perform a raw sector mode read of an audio CD to obtain the ToC entry for a track. At step 308, the transformation calculation described in connection with FIG. 2 takes place and the result is used to build the correlated entry in the virtual directory. At step 310, the logic determines whether more tracks remain in the ToC. If so, control returns to step 306; else, the logic terminates at 330.

If the determination is made at step 304 that a seek within an audio file is requested, then at step 312 the current location, 210 FIG. 3, is saved and control is passed to step 330. If a read of audio data is to occur, at step 320 the conversion of the Current Location, passed by operating system 20 to IFS 30 and saved (FIG. 3) to time in frames takes place as above described in connection with FIG. 3.

The output of step 320 is in track relative time. At step 321 the A-Time start of track is added to the track relative time calculated in step 320. The result of this addition yields the A-Time at which the read will begin. The CD in drive 50 is read using the parameters developed in step 321 as indicated at step 322.

Step 326 represents the reformatting of the audio data read from the audio CD at step 322 into that format specified by operating system 20. The reformatted data is then returned to the operating system at step 328 and the logic terminates at 330. It should be noted that reformatting step 326 is straight forward since audio files are one dimensional.

While the present invention has been described having reference to a particular illustrative embodiment including a particular CD format standard, those having skill in the art will appreciate that the inventive method can be implemented in other environments utilizing other formats with modifications corresponding thereto in the details of the implementing software without departing from the scope and intent of the appended claims.

What is claimed is:

1. In an installable file system for use with an operating system interconnected within a client server network, a method for accessing and distributing audio data comprising:

reading Table of Contents information off an audio CD in a CD-ROM driver;

constructing a virtual directory of audio files, having one file corresponding to each track on said audio CD by calculating a size for each file in said virtual directory of audio files as a function of length information associated with each track in said audio CD Table of Contents;

bidirectionally transforming audio CD track time information into byte offsets into said virtual directory of audio files;

forward mapping audio CD Table of Contents track time information in minutes, seconds and frames into virtual file byte offsets when constructing said virtual file directory; and back mapping virtual file byte offsets into audio CD track times in minutes, seconds and frames when reading audio CD data.

2. The method of claim 1 additionally including the step of:

reformatting data read from said audio CD into a format specified by said operating system.

3. In an installable file system for use with an operating system interconnected within a client server network for providing access to and distribution of audio data on an audio CD in a CD-ROM drive, said installable file system including;

means for reading in raw sector mode Table of Contents information from said audio CD;

means for building a virtual file specification corresponding to each track on said audio CD;

means for calculating size of each virtual file as a function of length in time information associated with each audio CD track in said audio CD Table of Contents; and mapping means for transforming audio CD time information from said Table of Contents in minutes, seconds and frames into byte offsets for identifying files in said virtual directory of audio files the improvement comprising:

forward mapping means operable to transform audio CD total track times to virtual file byte lengths when constructing said virtual file directory;

back mapping means operable to transform virtual file byte offsets to audio CD times when a read operation for audio CD data is initiated by said operating system; and reformatting means for converting data read from said audio CD into a format expected by said operating system.

4. A computer program having data structures included on a computer readable medium for use with an operating system interconnected within a client server network for providing access to and distribution of audio data comprising:

means for reading in raw sector mode Table of Contents information from said audio CD;

means for building a virtual file specification corresponding to each track on said audio CD;

means for calculating size of each virtual file as a function of length in time information associated with each audio CD track in said audio CD Table of Contents;

mapping means for transforming audio CD time information from said Table of Contents in minutes, seconds and frames into byte offsets for identifying files in said virtual directory of audio files;

forward mapping means operable to transform audio CD total track times to virtual file byte lengths when constructing said virtual file directory;

back mapping means operable to transform virtual file byte offsets to audio CD times when a read operation for audio CD data is initiated by said operating system; and reformatting means for converting data read from said audio CD into a format expected by said operating system.

* * * * *